(12) United States Patent
Jones et al.

(10) Patent No.: US 7,709,421 B2
(45) Date of Patent: May 4, 2010

(54) MICROEMULSIONS TO CONVERT OBM FILTER CAKES TO WBM FILTER CAKES HAVING FILTRATION CONTROL

(75) Inventors: Thomas A. Jones, Cypress, TX (US); David E. Clark, Humble, TX (US); Lirio Quintero, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 307 days.

(21) Appl. No.: 11/873,775

(22) Filed: Oct. 17, 2007

(65) Prior Publication Data

US 2008/0076682 A1 Mar. 27, 2008

Related U.S. Application Data

(60) Continuation-in-part of application No. 11/541,860, filed on Oct. 2, 2006, which is a division of application No. 11/218,822, filed on Sep. 2, 2005, now Pat. No. 7,134,496.

(60) Provisional application No. 60/606,959, filed on Sep. 3, 2004.

(51) Int. Cl.
*B01F 3/08* (2006.01)
*C09K 8/28* (2006.01)
*E21B 43/27* (2006.01)

(52) U.S. Cl. .................. 507/131; 166/278; 166/300; 166/304; 166/312; 166/381; 166/386; 175/64; 175/65; 175/75; 507/135; 507/138; 507/241; 507/260; 507/267; 516/21; 516/27; 516/203; 516/204

(58) Field of Classification Search .......... 507/131, 507/135, 138, 241, 260, 267; 166/278, 300, 166/304, 312, 381, 386; 175/64, 65, 75; 516/21, 27, 203, 204
See application file for complete search history.

(56) References Cited

U.S. PATENT DOCUMENTS

| | | | |
|---|---|---|---|
| 3,804,760 A | 4/1974 | Darley | |
| 4,036,300 A | 7/1977 | Holm et al. | |
| 4,882,075 A | 11/1989 | Jones | |
| 5,189,012 A | 2/1993 | Patel et al. | |
| 5,286,386 A | 2/1994 | Darian et al. | |
| 5,707,939 A | 1/1998 | Patel | |
| 5,811,383 A | 9/1998 | Klier et al. | |
| 5,830,831 A | 11/1998 | Chan et al. | |
| 5,869,433 A | 2/1999 | Patel | |
| 6,593,279 B2 | 7/2003 | Von Krosigk et al. | |
| 6,793,025 B2 | 9/2004 | Patel et al. | |
| 7,134,496 B2 * | 11/2006 | Jones et al. ............ | 166/278 |
| 2003/0166472 A1 | 9/2003 | Pursley et al. | |
| 2004/0140094 A1 | 7/2004 | Todd et al. | |
| 2004/0147404 A1 | 7/2004 | Thaemlitz et al. | |
| 2004/0259738 A1 | 12/2004 | Patel | |
| 2006/0096757 A1 | 5/2006 | Berry et al. | |

FOREIGN PATENT DOCUMENTS

| | | |
|---|---|---|
| GB | 2347682 A | 9/2000 |
| WO | 9905392 A1 | 2/1999 |
| WO | 9941342 A1 | 8/1999 |
| WO | WO0100747 A | 1/2001 |
| WO | 2006109016 A1 | 10/2006 |

OTHER PUBLICATIONS

K. Holmberg, "Quarter Century Progress and New Horizons in Microemulsions," Micelles, Microemulsions and Monolayers, D. Shah, ed. 1998, pp. 161-192, Marcel Dekker, New York.
T. Huang, et al., Carbonate Matrix Acidizing Fluids at High Temperatures: Acetic Acid, Chelating Agents or Long-Chained Carboxylic Acids?:, SPE European Formation Damage Conference, May 13-14, 2003, SPE 82268.
H.A. Nasr-El-Din, et al., "Evaluation of a New Barite Dissolver: Lab Studies," SPE International Symposium and Exhibition on Formation Damage Control, Feb. 18-20, 2004, SPE 86501.
I. Lakatos, et al., "Potential of Different Polyamino Carboxylic Acids as Barium and Strontium Sulfate Dissolvers," SPE European Formation Damage Conference, May 25-27, 2005, SPE 94633.
J. Harrison; "Microemulsion Technology for Surfactants," Specialty Chemicals Magazine, Nov. 2004, pp. 32, 34, 36.

* cited by examiner

*Primary Examiner*—Timothy J. Kugel
(74) *Attorney, Agent, or Firm*—Mossman Kumar & Tyler PC

(57) ABSTRACT

Single phase microemulsions improve the removal of filter cakes formed during drilling with oil-based muds (OBMs). The single phase microemulsion removes oil and solids from the deposited filter cake. Optionally, an acid capable of solubilizing the filter cake bridging particles may also be used with the microemulsion. In one non-limiting embodiment the acid may be a polyamino carboxylic acid. Skin damage removal from internal and external filter cake deposition can be reduced. In another optional embodiment, the single phase microemulsion may contain a filtration control additive for delaying the filter cake removal, destruction or conversion.

17 Claims, 5 Drawing Sheets

MICROEMULSIONS TO CONVERT OBM FILTER CAKES TO WBM FILTER CAKES HAVING FILTRATION CONTROL

CROSS-REFERENCE TO RELATED APPLICATIONS

This application is a continuation-in-part of U.S. patent application Ser. No. 11/541,860 filed Oct. 2, 2006, which is a divisional application from U.S. patent application Ser. No. 11/218,822 filed Sep. 2, 2005, now U.S. Pat. No. 7,134,496 that issued Nov. 14, 2006, which in turn claims the benefit of U.S. Provisional Application No. 60/606,959 filed Sep. 3, 2004.

TECHNICAL FIELD

The present invention relates to methods and compositions for reducing or removing wellbore skin damage, invert emulsion drilling fluid and filter cake deposition during and after oil well drilling, and more particularly relates, in one non-limiting embodiment, to methods and compositions for reducing or removing invert emulsions and bridging particles using nanoemulsion, miniemulsions, microemulsions systems in equilibrium with excess oil or water, or both (Winsor III), single phase microemulsions (Winsor IV), or single phase microemulsions formed in-situ.

BACKGROUND

Drilling fluids used in the drilling of subterranean oil and gas wells along with other drilling fluid applications and drilling procedures are known. In rotary drilling there are a variety of functions and characteristics that are expected of drilling fluids, also known as drilling muds, or simply "muds". The drilling fluid should carry cuttings from beneath the bit, transport them through the annulus, and allow their separation at the surface while at the same time the rotary bit is cooled and cleaned. A drilling mud is also intended to reduce friction between the drill string and the sides of the hole while maintaining the stability of uncased sections of the borehole. The drilling fluid is formulated to prevent unwanted influxes of formation fluids from permeable rocks penetrated and also often to form a thin, low permeability filter cake which temporarily seals pores, other openings and formations penetrated by the bit. The drilling fluid may also be used to collect and interpret information available from drill cuttings, cores and electrical logs. It will be appreciated that as defined herein, the term "drilling fluid" also encompasses "drill-in fluids" and "completion fluids".

Drilling fluids are typically classified according to their base fluid. In water-based muds, solid particles are suspended in water or brine. Oil can be emulsified in the water. Nonetheless, the water is the continuous phase. Oil-based muds are the opposite or inverse. Solid particles are suspended in oil, and water or brine is emulsified in the oil and therefore the oil is the continuous phase. Oil-based muds which are water-in-oil macroemulsions are also called invert emulsions. The oil in oil-based (invert emulsion) mud can consist of any oil that may include diesel, mineral oil, esters, or alpha olefins. Brine-based drilling fluids, of course are a water-based mud in which the aqueous component is brine.

It is apparent to those selecting or using a drilling fluid for oil and/or gas exploration that an essential component of a selected fluid is that it be properly balanced to achieve the necessary characteristics for the specific end application. Because drilling fluids are called upon to perform a number of tasks simultaneously, this desirable balance is not always easy to achieve.

Filter cakes are the residue deposited on a permeable medium such as a formation surface when a slurry or suspension, such as a drilling fluid, is forced against the medium under pressure. Filtrate is the liquid that passes through the medium, leaving the cake on the medium. Cake properties such as cake thickness, toughness, slickness and permeability are important because the cake that forms on permeable zones in a wellbore can cause stuck pipe and other drilling problems. Reduced hydrocarbon production can result from reservoir or skin damage when a poor filter cake allows deep filtrate invasion. In some cases, a certain degree of cake buildup is desirable to isolate formations from drilling fluids. In open hole completions in high-angle or horizontal holes, the formation of an external filter cake is preferable to a cake that forms partly inside the formation (internal). The latter has a higher potential for formation damage. It will be appreciated that in the present context the term "filter cake" includes any emulsion or invert emulsion part of the filter cake, and that the filter cake is defined as a combination of any added solids, if any, and drilled solids. It will also be understood that the drilling fluid, e.g. invert emulsion fluid, is concentrated at the bore hole face and partially inside the formation. Further, an open hole completion is understood to be a well completion that has no liner or casing set across the reservoir formation, thus allowing the produced fluids to flow directly into the wellbore. A liner or casing may be present in other intervals, for instance between the producing interval and the surface.

Many operators are interested in improving formation clean up after drilling into reservoirs with invert emulsion drilling fluids. More efficient filter cake and formation clean up is desired for a number of open hole completions, including stand-alone and expandable sand screens as well as for gravel pack applications for both production and water injection wells. Skin damage removal from internal and external filter cake deposition during oil well reservoir drilling with invert emulsion drill-in and drilling fluids is desirable to maximize hydrocarbon recovery, particularly in open hole completions.

Further, it is often desirable in the destruction and removal of invert emulsion filter cake to not do so quickly, but rather to delay the destruction and removal of the filter cake. Without control of the destruction rate, massive brine losses may occur quickly and before the work string can be safely pulled out of the open wellbore.

It would be desirable if compositions and methods could be devised to aid and improve the ability to clean up filter cake, and to remove it more completely, without causing additional formation damage. It is also desirable to control the rate of destruction and removal of the filter cake.

SUMMARY

There is provided, in one non-limiting form, a method of removing a majority of OBM filter cake particles from a hydrocarbon reservoir wellbore that involves drilling a wellbore in a hydrocarbon reservoir with an OBM (defined herein to include a drill-in fluid as well). A filter cake of OBM particles is formed over at least part of the wellbore. The oil-based fluids and filter cake are contacted with at least one surfactant and a polar liquid to form nanoemulsions, miniemulsions, and/or microemulsions in equilibrium with excess oil or water or both (Winsor III) and/or single phase microemulsions (Winsor IV) in situ. Any of these in-situ fluids include a filtration control additive that may be solid particulates and/or water-soluble polymers. This may be accomplished without circulating the well. The altered filter cake may then be removed with production, injection, acid treatment, or displacement.

An acid may be optionally used to solubilize the particles in the filter cake. The acid may be a mineral acid and/or an organic acid, and in one non-limiting embodiment may be a polyamino carboxylic acid (PACA).

Further, there is provided in another non-restrictive embodiment a method for open hole completions that involves drilling to total depth with oil-based drilling fluids, which fluids comprise acid-soluble weighting and/or bridging agents and the forming of a filter cake. At total depth a short trip is made into the casing above the open hole, and further involves running a work string back in the open hole (RIH) to the bottom and chemically conditioning the drilling fluid to optimize displacement, as necessary. A base oil spacer is pumped to scour the external filter cake in the wellbore. A viscosified, weighted push pill is pumped, where the push pill includes at least the OBM or invert emulsion drilling fluid. Next, a solids-free OBM or invert emulsion drilling fluid is pumped into the open hole and at least partially into the casing above the casing shoe and above the open hole. Once the leading edge of OBM or solids-free invert emulsion fluid is positioned above the casing shoe, the bottom of the work string is pulled up into the casing shoe. At this time the original drilling fluid is circulated across appropriately sized shaker screens so that the larger solids in the drilling fluid are removed and the particles remaining will not plug completion screens. Subsequently, the work string is pulled out of the hole to surface and the completion screen is run to the bottom of the open hole. The completion screen, a sand control device, may be of any type but typically is either an expandable, stand-alone or gravel pack screen. With the sand control screen safely on bottom, the solids-free OBM or invert emulsion drilling fluid is displaced out of the open hole and partially into the casing and above packer assembly with the single phase microemulsion. Next the work assembly or expandable tools are tripped out of the hole and preparations are made to run in the hole and set the packer. Once the packer is set and the open hole is isolated from the casing interval, the single phase microemulsion is allowed to penetrate filter cake and decompose the filter cake components without circulating the well. Again, the single phase microemulsion, nanoemulsion, miniemulsions or microemulsions systems in equilibrium with excess oil or water, or both (Winsor II) include a filtration control additive that may be solid particulates and/or water-soluble polymers. Finally, when surface preparations are complete and the wellbore has been reentered, water is injected to charge the reservoir to produce hydrocarbons. Acid is an optional component of the single phase microemulsion.

Additionally, there is also provided in another non-limiting embodiment, a method for removing a majority of OBM filter cake particles from a hydrocarbon reservoir wellbore that includes drilling a wellbore in a hydrocarbon reservoir with an OBM. A filter cake is formed of OBM particles over at least part of the wellbore. During the gravel packing operation, the gravel pack carrier fluid is treated with the single phase microemulsion, which may contain the filtration control additives herein. Once the gravel is in place, the carrier fluid containing the single phase microemulsion resides in the inter-granular spaces. The single phase microemulsion is allowed to contact the filter cake for a time after the gravel is in place, without circulating the well. At least a majority of the filter cake is removed. Furthermore, in a separate operation, an optional acid soak may be placed inside the gravel pack sand screens and allowed to penetrate the gravel to the acid soluble bridging material remaining on the reservoir face. After the acid soak, water injection operations can proceed.

There is additionally provided in an alternate embodiment a thermodynamically stable, macroscopically homogeneous, single phase microemulsion that includes a polar phase; a nonpolar phase; a filtration control additive; a surfactant; and a polyamino carboxylic acid (PACA).

DETAILED DESCRIPTION

Figure 1:
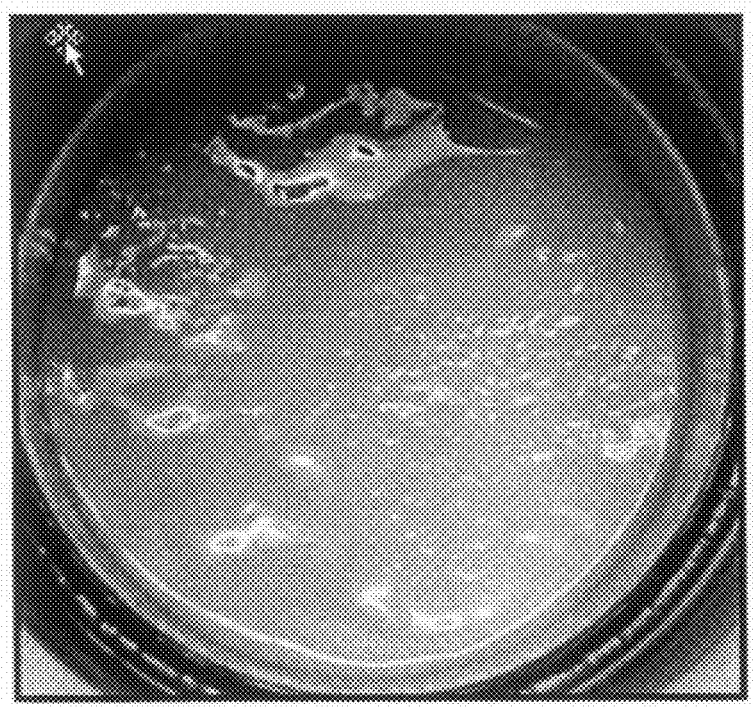
FIG. 1 is a photograph of a typical mud cake or filter cake appearance on a ceramic disc after mud-off at 500 psi (3.4 MPa) and 150° F. (66° C.), before contact with any soak solutions.

It has been discovered that post drill-in treatment and alteration of a majority of filter cake particles can be accomplished by changing the OBM into a nanoemulsion, a miniemulsion, a microemulsion (Winsor III) and/or single phase microemulsion, such as Winsor IV or similar chemistry, as will be described in more detail. As defined herein these emulsion fluids may be pre-formed prior to use and/or may be formed in situ at or near contact with the OBM and/or OBM particles. Single phase microemulsions may be defined as bi-continuous, O/W and W/O. In one non-limiting explanation of the inventive phenomenon, an o/w single phase microemulsion contacts the oil-based mud and filter cake and forms a water continuous (oil-in-water) microemulsion. It has been surprisingly discovered that this contacting may be accomplished without circulating the well, by which is meant pumping fluid through the whole active fluid system, including the borehole and all the surface tanks that constitute a primary system. The literature generally describes these microemulsions as single phase microemulsions.

Further, in many cases, particularly in open hole completion operations, when the destruction and removal of OBM filter cake is desired, most operators require a delay in the destruction rate. Without a control of the destruction rate, massive brine losses may occur quickly and before the work string can be safely pulled out of the open wellbore. In an alternate embodiment of the methods and compositions herein, a Winsor IV microemulsion (or similar type of fluids) may be formulated in a manner such that the reversal of filter cake wettability actually changes the filter cake components to a water-based filter cake with fluid loss control. The control mechanism is such that brine losses may be controlled for a sufficient period of time that rig personnel are able to pump the microemulsion spot solution down a workstring across the interval of interest and have time to pull the workstring out of the open hole section before massive brine losses occur. In one non-restrictive version, an important factor contributing to the development of a water-based filter cake during wettability changes is the addition of a water-soluble filtration control additive, including, but not necessarily limited to, a water-soluble starch and/or solid particulates.

The use of these fluid systems (single phase microemulsion, nanoemulsion, miniemulsions, or microemulsions) in equilibrium with excess oil or water, or both (Winsor III) or similar chemistry in open hole completion optionally allows the direct contact of a chelating agent, such as an acid and/or an acid blend mixed in conventional brine completion fluids, without causing a high viscosity oil continuous emulsion (sludge) and formation blockage. The action of the single phase microemulsion alters the deposited filter cake which allows a chelating agent such as an acid or a salt of an acid, such as a polyamino carboxylic acid (PACA) and/or a mineral acid or salt thereof, e.g. hydrochloric acid or an organic acid or salt thereof, e.g. acetic acid, or other acid, to solubilize the bridging and formation particles, such as calcium carbonate, hematite, ilmenite, and barite. Bridging particles composed of manganese tetroxide (in one non-limiting embodiment) may be treated with a single phase microemulsion/acid blend, providing the acid is an organic acid in one non-limiting embodiment. It has been found that PACAs perform relatively better in an alkaline environment as the salt of these acids, which further differentiates them from the more common acidic acids and salts thereof.

For instance a salt of PACA dissociates barium sulfate from the calcium carbonate treated; the PACA takes on the cation. In a non-limiting example, a Na or K salt of PACA when contacting calcium carbonate contacts and dissolves the barium salt through cationic exchange. The salt form of PACAs performs relatively better than the plain acid form, but the non-salt acid form still performs the functions and achieves the desired results of the methods and compositions herein. The plain acid form works somewhat better at relatively low pH.

The net effect of such a treatment system will improve an operator's chance of injecting water in a reservoir to maintain reservoir pressure (for example, for injection wells), and improve production rates in producing wells. In either case, skin (filter cake) alteration is accomplished by circulating and placing the single phase microemulsion across the injection/production interval. The single phase microemulsion may be used for open hole expandable and non-expandable screen applications or other various open hole operations. With the optional employment of a filtration control additive, also called an additive for delay or AD herein, the skin removal rate may be controlled for operational flexibility.

In brief, one non-limiting embodiment OBM or invert emulsion filter cake clean up technology herein, also referred to as "one-step" filter cake clean up, utilizes single phase microemulsion and optional chelating agent techniques and optional filtration control additives in a single blend to change the emulsion of an OBM or invert emulsion filter cake to a microemulsion and simultaneously decompose its acid soluble components. Altering the filter cake using single phase microemulsions facilitates solubilization of solids by preventing a sludge that could form between the chelating agent and OBM or invert emulsion cake and making soluble particles unavailable to unspent chelating agent.

It will be appreciated that it is not necessary for all of the particles to be removed from a filter cake for the inventive method and its compositions to be considered successful. Success is obtained if more particles are removed using the single phase microemulsion than if it is not used, or if more particles are removed using a single phase microemulsion together with a chelating agent, as compared to the case where no microemulsion and/or chelating agent is used. Alternatively, the methods herein are considered successful if a majority of the filter cake particles are removed. In general, of course, it is desirable to remove as much of the OBM or invert emulsion and corresponding filter cake as possible. One non-restrictive goal is to remove filter cake particles to obtain 90% injection or production permeability.

Of particular interest is the ability to drill into a reservoir having massive shale sections with an OBM or invert emulsion drill-in fluid and gravel packing the same wellbore using brine as the carrier fluid for the gravel pack sand. For this technique to be effective, shale stability must be maintained and there must not be unwanted sludge created between the brine carrier fluid and OBM or invert emulsion filter cake during or after the gravel pack.

The wellbore clean up technology described herein has a wide range of applications. By combining the chemical aspect of wellbore (filter cake) clean up with displacement techniques, it is believed that gravel packing disadvantages after drill-in with OBMs or invert emulsion fluids and gravel packing with brine carrier fluids can be significantly reduced or eliminated.

The methods and compositions herein have the advantages of reduced formation skin damage to the wellbore, and consequently increased hydrocarbon recovery, and/or increased water injection rate, as compared with an otherwise identical method and composition absent the nanoemulsion, miniemulsions or single phase microemulsions and/or any of these type of fluids including a chelating agent and/or absent any of these fluids including a filtration control additive. Microemulsions are thermodynamically stable, macroscopically homogeneous mixtures of at least three components: a polar phase and a nonpolar phase (usually, but not limited to, water and organic phase) and a surfactant. Microemulsions form spontaneously and differ markedly from the thermodynamically unstable macroemulsions, which depend upon intense mixing energy for their formation. Microemulsions are well known in the art, and attention is respectfully directed to S. Ezrahi, A. Aserin and N. Garti, "Chapter 7: Aggregation Behavior in One-Phase (Winsor IV) Microemulsion Systems", in P. Kumar and K. L. Mittal, ed., Handbook of Microemulsion Science and Technology, Marcel Dekker, Inc., New York, 1999, pp. 185-246.

The referenced chapter describes the types of microemulsion phase formulations defined by Winsor: Winsor I, Winsor II and Winsor III. A system or formulation is defined as: Winsor I when it contains a microemulsion in equilibrium with an excess oil phase; Winsor II when it contains a microemulsion in equilibrium with excess water; and Winsor III when it contains a middle phase microemulsion in equilibrium with excess water and excess oil. The author also describes Winsor IV as a single-phase microemulsion, with no excess oil or excess water. Although not wishing to be limited by any one theory, it is believed that the microemulsions formed in the methods and compositions herein are of the Winsor IV type, which means the entire system is a microemulsion phase. The thermodynamically stable single phase Winsor IV microemulsion could evolve by a change in formulation or composition into the formation of a miniemulsion or nanoemulsion, which is a two-phase system with submicron size droplets which could be stable for long period of time, but not permanently stable as a microemulsion, as explained in reference J. L. Salager, "Emulsion Phase Inversion Phenomena" in *Emulsions and Emulsion Stability*, J. Sjöblöm Ed., $2^{nd}$ Edition, Chap. 4, pp. 185-226, Taylor and Francis, London (2006).

Surfactants suitable for creating the single phase microemulsions herein include, but are not necessarily limited to nonionic, anionic, cationic and amphoteric surfactants and in particular, blends thereof. Co-solvents or co-surfactants such as alcohols are optional additives used in the microemulsion formulation. Suitable nonionic surfactants include, but are not necessarily limited to, alkyl polyglycosides, sorbitan esters, methyl glucoside esters, amine ethoxylates, diamines ethoxylates, polyglycerol esters, alkyl ethoxylates, polypropoxylated and/or ethoxylated alcohols. Suitable cationic surfactants include, but are not necessarily limited to, arginine methyl esters, alkanolamines and alkylenediamides.

In one non-limiting embodiment the suitable anionic surfactants include alkali metal alkyl sulfates, alkyl ether sulfonates, alkyl sulfonate, branched ether sulfonates, alkyl disulfonate, alkyl disulfate, alkyl sulfosuccinate, alkyl ether sulfate, branched ether sulfates.

In another non-restrictive embodiment, the microemulsion formulation contains a co-surfactant which is an alcohol having from about 3 to about 10 carbon atoms, in another non-limiting embodiment from about 4 to about 6 carbon atoms. A specific example of a suitable co-surfactant includes, but is not necessarily limited to butanol.

In one non-limiting embodiment, the single phase microemulsion contains non-polar liquid, which may include a synthetic fluid including, but are not necessarily limited to, ester fluids; paraffins (such as PARA-TEQ™ fluids from Baker Hughes Drilling Fluids) and isomerized olefins (such as ISO-TEQ™ from Baker Hughes Drilling Fluids). However, mineral oils such as Escaid 110 (from Exxon) or ECD 99-DW oils (from TOTAL) can also be used as a non-polar liquid in preparing the fluid systems herein.

It will be appreciated that the amount of single phase microemulsion-forming components (polar, nonpolar and a surfactant) to be used is difficult to determine and predict with much accuracy since it is dependent upon a number of interrelated factors including, but not necessarily limited to, the brine type, the bridging particle type, the temperature of the formation, the particular surfactant or surfactant blend used, whether a chelating agent is present and what type, etc. Nevertheless, in order to give some idea of the quantities used, in one non-limiting embodiment, the proportion of non-brine components in the single phase microemulsion may range from about 1 to about 50 volume %, from about 5 to about 20 volume %, and in another non-limiting embodiment may range from about 5 to about 20 volume %.

It is expected that brine will be a common component of the single phase microemulsion, and any of the commonly used brines, and salts to make them, are expected to be suitable in the compositions and methods herein.

In the non-limiting embodiment where the single phase microemulsion contains at least one chelating agent, the chelating agent should be capable of solubilizing or dissolving the bridging particles that make up the filter cake. The chelating agent may be an inorganic acid or salt thereof including, but not necessarily limited to, hydrochloric acid, sulfuric acid, and/or an organic acids including, but not necessarily limited to, an organic agent or salt thereof, e.g. acetic acid, formic acid and mixtures thereof. In one non-limiting embodiment, the acid may be only one mineral acid or only one organic acid.

In most embodiments, the microemulsion may contain at some point a chelating agent that is a polyamino carboxylic acid (PACA) or a salt of PACA. Suitable PACAs include, but are not necessarily limited to, nitrilotriacetic acid (NTA), ethylenediamine tetraacetic acid (EDTA), trans-1,2-diaminocyclohexane-N,N,N',N',-tetraacetic acid monohydrate (CDTA), diethylenetriamine pentaacetic acid (DTPA), dioxaoctamethylene dinitrilo tetraacetic acid (DOCTA), hydroxyethylethylenediamine triacetic acid (HEDTA), triethylenetetramine hexaacetic acid (TTHA), trans-1,2-diaminocyclohexane tetraacetic acid (DCTA), and mixtures thereof.

The concentration of chelating agent in the single phase microemulsion has a lower limit of about 1 volume %, alternatively of about 5 volume %, and an upper limit of about 30 volume %, alternatively about 20 volume %, and in another non-restrictive embodiment up to about 15 volume %.

There are various ways by which the chelating agent may be delivered according to the inventive procedure. The chelating agent may be added to the filter cake with the single phase microemulsion; or may be added after the single phase microemulsion treatment; or may be added to the microemulsion soak solution once it is in place before removing the majority of the filter cake particles and OBM or invert emulsion and combinations thereof.

Typical or expected bridging particles expected to be useful in the methods herein include, but are not necessarily limited to, calcium carbonate, hematite, ilmenite, manganese tetroxide, manganous oxide, iron carbonate, magnesium oxide, barium sulfate, and mixtures thereof.

In the embodiment where a gravel pack is introduced, the single phase microemulsion is created in carrier brine containing sized gravel (sand) where the gravel is sized to bridge the formation to inhibit or prevent the production of sand. The gravel pack embodiment will be discussed in further detail below.

With further specificity, the methods and compositions herein may concern one-trip clean up spotting fluids designed to physically change an OBM filter cake and acidify the acid soluble components on the cake. The inventive method not only physically changes the nature of the deposited filter cake, the resulting oil components of the original filter cake which are micro-emulsified, allow for ease of water injection, in the case of injection wells, or ease of production through completion screens, in the case of production wells. With the conversion of the external oil to internal microemulsified oil in water, plus the optional decomposition of minerals (e.g. bridging particles e.g. calcium carbonate and other acid-soluble components) by chelating agents, most of the filter cake is either removed or micro-sized to the extent that only a minimal or reduced amount of damaging components remain on a reservoir face.

In one non-limiting embodiment, the compositions and methods herein utilizes a microemulsion or other in-situ fluid and a filtration control additive (fluid loss control additive), such as a polymer and/or solid particulates such as sized salts, to convert an OBM cake to a water-based filter cake. The benefits of such conversions are several. When an OBM filter cake is oil wet and poses compatibility problems for certain completion operations, such as water injection and gravel packing, a water-based filter cake is naturally compatible with injection water and brine-based gravel pack carrier fluids. Additionally, a water-based filter cake is ideal for damage remediation (filter cake destruction) when mineral acids, organic acids, oxidizing agents, water soluble enzymes (catalysts) and in situ acid generators are spotted in a wellbore after (or during) the filter cake reversal process.

This non-restrictive method may use a polymeric filtration control additive, such as but not limited to a non-ionic starch or other cellulosic additives, such as, but not limited to HEC (hydroxyethyl cellulose). When one of these fluid loss control additives is pre-solubilized in the water phase of a microemulsion blend, the fluid loss control additive retards the disintegration of the filter cake that happens when the oil is solubilized into the water phase. The filter cake becomes water-wet, but maintains a compact consistency for a longer time when compared to the treatment without fluid loss additive in the microemulsion treatment fluid. The solid particulates that once comprised the OBM filter cake, such as sized calcium carbonate and barite, or any other particulates, are still in place after the conversion. The fluid loss control additive found in the microemulsion soak solution is deposited in and around pre-existing particulates to redevelop a water-based filter cake. It should be recognized that this process, reversal of an oil wettability (OBM) to water-based wettability, including the deposition of the water-based fluid loss control additive occurs in a single step.

As the an OBM filter cake is converted with the aforementioned water-based filtration control additive, the microemulsion or in situ fluid soak solution may also contain acids, barite dissolvers (chelants) or other precursor additives that can dissolve the acid-soluble particles or dissolve the barite and break down the fluid loss additive (polymeric or otherwise). The value of such a conversion using a single soak solution with all its functional components is that the OBM filter cake may be converted to a water-based filter cake containing dissolvable particulates and fluid loss control additives that may be removed in a single operational step. In addition, if immediate destruction is not required, a one-step soak solution may be formulated such that the water-based filter cake maintains its integrity until destruction is required.

For the embodiment where the microemulsion contains a filtration control additive, the microemulsion may be Winsor III or Winsor IV. The fluid loss additive that regenerates a filter cake during the wettability change may include solid particulates, including, but not necessarily limited to, sized salts, hematite, ilmenite, manganese tetroxide, and mixtures thereof, the water-soluble polymers such as natural and synthetic polymers and copolymers including, but not necessarily limited to, xanthan gum, simple starches, carboxymethylated starch and other modified starches, crosslinked starches and mixtures thereof. By sized salt in the context of the filtration control additive, the sized salt may include, but is not necessarily limited to NaCl, NaBr, KBr, HOCOOK, HOOGNa, and combinations thereof.

Modified starches may be used. A modified starch usually refers to a carboxymethylated starch, although the starch may be modified in other ways. One or more carboxymethyl groups may be grafted on to a simple starch to give it additional temperature stability as well as improved rheological properties. Starches may also be crosslinked, such as with agents including, but not necessarily limited to, epichlorohydrin, polyvinyl alcohol, boric acid, glyoxal, succinic acid, urea/formaldehyde, and combinations thereof.

Generally, the sized salts are used to replace the calcium carbonate in the OBM. These sized salts may then be dissolved with undersaturated water when desired. The sizes of the sized salt are specified in microns. Usually we specify the blended size as a D50 (average or 50%) diameter in microns of the blend as measured on a particle size analyzer. The blended sizes are also given D90 and D10 designations. D90 refers to 90% of particles being smaller than a measured micron size. Likewise, a D10 refers to 10% of the blended salt particles are less than a certain measured micron size.

In one non-limiting embodiment, the proportion of filtration control additive in the microemulsion ranges from about 0.1 to about 10 lb/bbl (about 0.7 to about 29 g/liter). Alternatively, the upper proportion range of the filtration control additive may be about 2.0 lb/bbl (about 5.7 g/liter). The exact or desired proportion of filtration control additive in the microemulsion will depend upon a number of interrelated factors, including, but not necessarily limited to, the type of filtration control additive, the type of microemulsion and type and proportion of components therein, as well as the nature of the OBM filter cake being contacted.

In another non-limiting embodiment, the salts suitable for use in creating the brine include, but are not necessarily limited to, sodium chloride, potassium chloride, calcium chloride, sodium bromide, calcium bromide, sodium formate, potassium formate, cesium formate and combinations thereof. The density of the brines may range from about 8.4 lb/gal to about 15 lb/gal (about 1 to about 1.8 kg/liter), although other densities may be given elsewhere herein.

The method of operation for an open hole completion deploying either expandable or non-expandable screens and changing the filter cake, including removing oil and decomposing the mineral fraction may be as follows, in one non-limiting embodiment:

1. Drill to total depth with an invert emulsion drilling fluid, which fluid includes acid-soluble weighting agents and/or bridging agents, where the weighting agents and/or bridging agents form a filter cake on the wellbore.
2. At total depth, a short trip is made into the casing.
3. Run the work string back in the hole (RIH) to the bottom and make any composition changes deemed necessary, such as chemical changes to optimize displacement, to the drilling fluid.
4. Pump a base oil spacer to scour any external filter cake in the wellbore.
5. Pump a viscosified, weighted push pill that includes the invert emulsion drilling fluid to carry dislodged particles up the wellbore away from the production zone.
6. Pump a solids-free invert emulsion drilling fluid into the open hole and at least partially into the casing, e.g. 100 to 200 feet (about 30 to about 61 meters) into the casing.
7. Once the leading edge of the solids-free invert emulsion fluid is positioned above the casing shoe, the bottom of the work string is pulled up into the casing shoe, and the original drilling fluid remaining in the casing and is circulated across appropriately sized shaker screens so that the larger solids are from the drilling fluid, leaving particles in the drilling fluid to a size that will not plug completion screens when running to bottom.
8. The work string is pulled out of the casing and the hole to the surface.
9. The completion screen may then be picked up and run to the bottom of the open hole. The completion screen, a sand control device, may be of any type but typically is either an expandable, stand-alone or gravel pack screen.
10. Expand screen, if the screen is expandable.
11. Trip out of the hole with the work string or expandable tools.
12. Run in the hole with modified CSAP (packer, ball valve and wash pipe) and set packer.
13. Displace the solids-free invert-emulsion in the open hole and spot the single phase microemulsion or in-situ fluid treatment, optionally containing the filtration control additive, in the open hole and 100-200 ft (30-61 m) into the casing, where the oil-in-water emulsion soak solution is as described previously.
14. Displace above packer assembly to single phase microemulsion treatment.

15. Check leak-off.
16. Allow the single phase microemulsion to penetrate the filter cake.
17. Prepare to inject water or produce hydrocarbons.

The single phase microemulsion or in-situ fluid treatment may be composed of different brine and oil blends, depending on the required density of the fluid for the well. The optional filtration control additive and optional acid or PACA chelating agent concentration may be varied as needed, including the type of additive or acid or chelating agent. One important new feature is that the microemulsion optionally contains a chelating agent (acid or salt thereof) or PACA chelating agent that dissolves solids contained in the OBM filter cake, and clean up a wellbore. Another important feature is that the microemulsion or in-situ fluid may optionally contain a filtration control agent or additive for delay to help lengthen the time that the filter cake is removed.

This technology does not require or discriminate against any OBM. In other words, the single phase microemulsion can be applied to filter cake clean up for any OBM fluid system regardless of base oil type or emulsifier used to formulate the mud. This versatility allows an operator flexibility to formulate the drilling fluid based on wellbore needs. This is not the case in some prior methods whereby highly specific amine emulsifiers are needed because they require acid protonation to reverse the wettability. In the inventive technology, the chelating agent is only used for removal of acid soluble bridging components. In one non-limiting embodiment the methods and compositions are practiced in the absence of amine emulsifiers, such as resin amines and/or amine emulsifiers of the formula R—N—[($CH_2CH_2R'A$)$_x$ H]$_2$, such as those defined in U.S. Pat. Appln. Pub. No. 2004/0147404.

Another important feature relative to other OBM filter cake removal methods is that the oil phase of the OBM is microemulsified into the single phase microemulsion or in-situ fluid. The inventive treatment process reduces the energy necessary for the microemulsion to form when compared to previous methods. This efficiency reduces the number of pipe trips and decreases the time required to complete the well. Further, the methods and compositions herein permit the filter cake to be maintained and then destroyed and removed over a controlled time period, particularly when a filtration control additive is included.

The invention will now be further discussed with respect to actual implementation of the invention in Examples which are not intended to limit the invention, but simply to further illustrate it.

A number of laboratory tests have been performed using the inventive single phase microemulsion or in-situ chemistry and Baker Oil Tools' acid treatment packages on filter cakes deposited by an OBM consisting of a 10 lb/gal (1.2 kg/liter) synthetic-based mud (SBM). Tables I, II, and III show permeability data after tests performed on 10 and 20 μm ceramic discs and Berea sandstone in a Disc-Sandpack Permeameter and a Hassler Permeameter. As the data below illustrates, the chemical techniques of removing filter cake damage and avoiding sludge damage has been demonstrated by performing a series of water injection tests. Water injection testing was chosen because this type of test mimics a "worse case" scenario and more easily exposes incomplete clean up results.

Phase I: Testing the Concept with a "Two-Step" Soak Procedure (Soak Without Acid Followed by Conventional Acidification Process)

The first phase of testing consisted of filter cake deposition on 3, 10, and 35 μm ceramic discs followed by treatment with a formulation, such as Exp-298 and DFE 734, a concentrate used to form the in situ single phase microemulsion. Both Exp-298 and DFE 734 are proprietary surfactants blend from Baker Hughes Drilling Fluids that contains a blend of surfactant with co-surfactants and water.

The first part of the test was the measurement of initial permeability. After establishing the initial seawater injection permeability, a mud-off was per-formed to deposit a filter cake for subsequent destruction by the soak solution. The cake deposition time for these tests was 3 hours. The purpose of a 3-hr mud-off, at 140° F. (60° C.), 150° F. (66° C.) or 194° F. (90° C.) and 500 psi (3.4 MPa) was to have a filter cake that had a reasonable thickness to "break", in order to verify the efficacy of the single phase microemulsion technology. Typical mud cake appearance after mud-off at 150° F. (60° C.) and 500 psi (3.4 MPa) is shown in the FIG. 1 photograph. After removing the mud from the cell and verifying that a good filter cake was deposited on the disc, the soak solution was carefully added and allowed to destroy the cake. Each soak solution contained 20% volume DFE 734 in $CaCl_2$ brine or in NaCl brine was allowed to soak at constant temperature (140° F. (60° C.), 150° F. (66° C.) or 194° F. (90° C.)) and 360 psi (2.5 MPa) overbalanced for 3.0 hours. The OBM mud was purposely formulated with at least 50 lb/bbl (143 g/liter) of calcium carbonate in anticipation of follow-up acid soak treatments.

Figure 2:
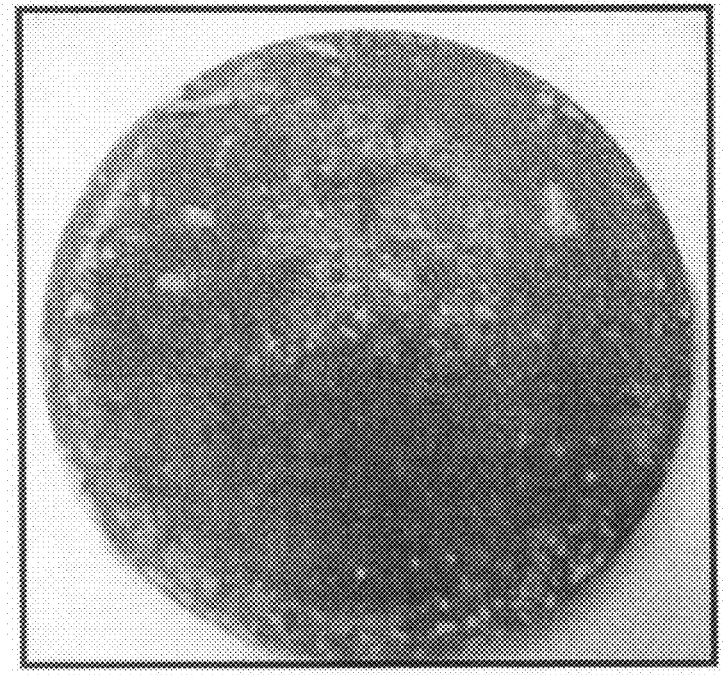
FIG. 2 is a photograph of a typical mud cake appearance on a ceramic disc such as that of FIG. 1 after a chemical soak containing no acid.
Figure 3:
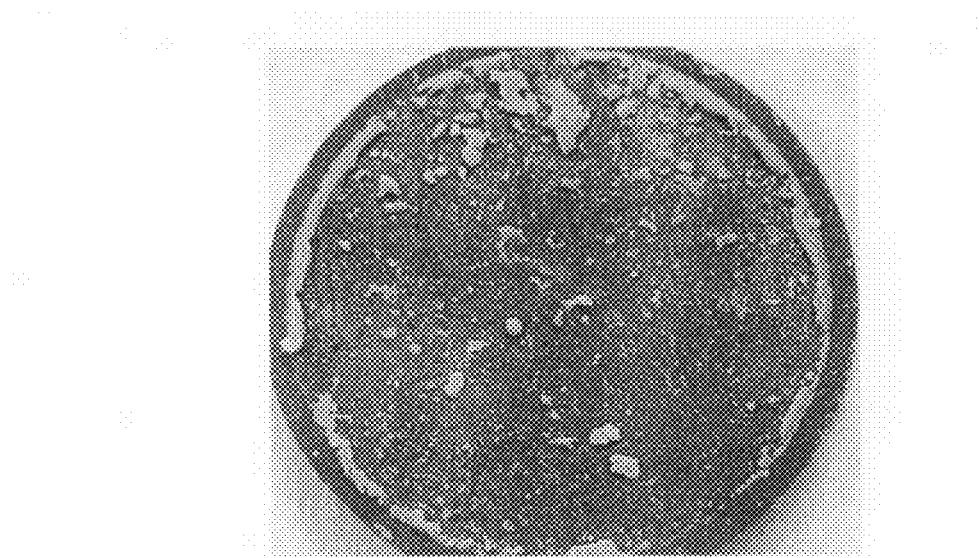
FIG. 3 is a photograph of a typical mud cake appearance on a ceramic disc after an acid soak.

After the disc was removed from the cell, the filter cake was observed and photographed (FIG. 2). Part of the remaining filter cake particles was tested in fresh water to observe its potential for dispersion or water-wet condition (seen in FIG. 3). It was observed that the filter cakes were dispersed completely in water. The disc with the remaining filter cake particles were placed in acid in order to observe the dissolution of calcium carbonate. The generation of $CO_2$ gas was further evidence that the particles in the filter cake were water-wet by the soak solution. Table I shows results of the injection permeability tests using 20% DFE 734 in 10 lb/gal (1.2 kg/liter) $CaCl_2$ brine and 15% DFE 734 in 9.3 lb/gal (1.1 kg/liter) NaCl brine.

TABLE I

Water injection Permeability Test Results
DFE 734/in situ Single Phase Microemulsion
Sandpack Permeameter/three-hour mud-off
on ceramic disc/leak-off valve closed
Test without acid

| Initial Permeability | Final Permeability | % Injection Permeability |
| --- | --- | --- |
| Test #1 - 20% DFE 734 in 10 lb/gal (1.2 kg/liter) $CaCl_2$ 20 hours soak at 140° F. (60° C.) and 360 psi (2.5 MPa) on 3 μm disc | | |
| 277.9 | 314.7 | 113.2 |
| Test #2 - 15% DFE 734 in 9.3 ppg NaCl 20 hours soak at 150° F. (66° C.) and 360 psi (2.5 MPa) on 20 μm ceramic disc | | |
| 280.7 mD | 253.8 mD | 90.4 |

Conclusions of "Two-Step" Soak Procedure (Soak Without Acid Followed by Conventional Acidification Process)

Phase I results suggest (94 to >100% water injection permeability) that the single phase microemulsion alters the filter cake (FIG. 2) so that when an acid treatment is added, the calcium carbonate particles may be dissolved by the acid without creating an unwanted sludge between the original OBM emulsion filter cake and the $CaCl_2$ brine single phase microemulsion.

The results in Tests 1 and 2 indicate that after the application of soak solution, the damage is removed as evidence by the high % injection permeability. The baseline test using only brine as a soak resulted in 0% injection permeability.

In summary, a two-step treatment consisting of an in situ microemulsification followed by an acid package (such as that previously identified in one non-limiting embodiment) will prepare a reservoir for water injection.

Phase 2: Testing the "One-Step" Soak Concept in the Sand Pack Permeameter

The second phase of the testing consisted of soaking the OBM filter cakes with blends of DFE 734 and an acid in brine. Tests were conducted with KCL, NaCl, HCOOK and NaBr. Examples using the blend of DFE 734 and acetic acid in $CaCl_2$ brine are shown in Table II and III.

The final density of the brines used in the tests of Table II and Table III were 10 lb/gal (1.2 kg/liter).

The first part of the test is the measurement of initial permeability. After establishing the initial seawater injection permeability, a 3-hour mud-off was performed to deposit a filter cake for subsequent destruction by the soak. After removing the mud from the cell and verifying that a good filter cake was deposited on the disc, the soak solution was carefully added and allowed to destroy the cake. The overbalanced pressure on the cake was 360 psi (2.5 MPa). A few pore volumes of filtrate were collected. Then, the solution was allowed to soak overnight with the valve closed. The next morning, the valve was opened in order to collect all of the filtrate. Next, seawater was pumped through the cell, forcing the residual soak solution through the disc. When the flow volume became stabilized, the test was terminated and the final water injection permeability was calculated.

Table II show the results of injection permeability performed with 20% DFE 734 and 10% formic acid in 10 lb/gal (1.2 kg/liter) calcium chloride brine. Table III show the results of injection permeability using a blend of 10% Acidgen HA (acetic acid generator)+2% CS GBS-1 (catalyst) to generate acetic acid in 20% DFE 734 in 10 lb/gal (1.2 kg/liter) calcium chloride brine. Both Acidgen HA and CS GBS-1 are available from Cleansorb LTD. This is an example of acetic acid being generated in situ in accordance with one optional embodiment of the method herein.

TABLE II

Water injection Permeability Test Results
DFE 734/in situ Single Phase Microemulsion
Sandpack Permeameter/three-hour mud-off
on ceramic disc/leak-off valve closed
Test #3 - 20% DFE 734 and 10% formic acid in 10 lb/gal
$CaCl_2$ (1.2 kg/liter) 20 hours soak at 140° F. (60° C.)
and 360 psi (2.5 MPa) on 3 μm disc
Test with 10% formic acid

| Initial Permeability | Final Permeability | % Injection Permeability |
|---|---|---|
| 201.4 mD | 358.1 | 177.6 |

TABLE III

Water injection Permeability Test Results
DFE 734/in situ Single Phase Microemulsion
Sandpack Permeameter/three-hour mud-off on 20 μm ceramic
disc and leak-off valve open
Test #4 - 20% DFE 734 with in 10 lb/gal (1.2 kg/liter)
$CaCl_2$ formulated with an in situ acid generator.
Soak at 194° F. (90° C.) and 360 psi (2.5 MPa) on 20 μm disc
Test with leak-off valve open
Test with 10% Acidgen HA + 2% CS GBS-1

| Initial Permeability | Final Permeability | % Injection Permeability |
|---|---|---|
| 684 mD | 661.5 mD | 96.7 |

Conclusions of "One-Step" Soak Procedure

Phase 2: Conclusions

Phase 2 demonstrated an important concept for the inventive methods herein. The "one-step" in situ single phase microemulsion soak solution composed of completion brine, 20% of the DFE 734 and 10% acid is compatible and works simultaneously to prepare a sand face for injection or production Other Considerations Screen Applications The "in-situ fluid" technology herein may be applied to filter cake clean up for stand-alone and expandable screen applications where an operator desires improved production or water injection. The advantage to this inventive method is that completion brine can be placed across the reservoir after the screens are in place and without the concern of producing unwanted sludge. The fact that OBM filter cake alteration and acidizing takes place simultaneously adds to a user's flexibility while saving time and money.

One non-limiting generalized procedure for using the "in-situ fluid" cake clean up technology is as follows.

Drill to total depth (TD)
Short Trip
Run in hole (RIH) to bottom and condition the mud rheologically
Pump push pill and solids-free OBM in open hole (OH) and 300 ft (91 m) of casing
Pick up (P/U) to 100 ft (30 m) above the shoe, circulate and size to solids across appropriate shale shakers
Pull out of the hole (POOH)
P/U EXPress or other screen assembly, fill with mud containing sized solids
RIH
Expand Screen if EXPress (expandable screen)
Trip out of hole (TOH) w/tools
RIH w/modified CSAP (packer, ball valve, wash pipe), set packer
Spot the "in-situ fluid" soak solution
Displace above the packer to brine
Check leak-off
Repeat spot/soak, as necessary
POOH Gravel Pack Embodiment The in situ microemulsion or other in situ fluid technology herein also has an application in gravel pack operations after a reservoir is drilled with an OBM. Most of the procedures would be the same as outlined above with expandable and stand-alone screens. Solids-free and solids-conditioned OBMs are left in the open hole and casing respectively until screens are placed on bottom and the packer is set. After the packer is set, the casing above the packer is displaced to brine and the casing is cleaned. When rigged up to pump casing, a series of push and cleaning pills are used to replace the open hole to brine and scour the filter cake. The gravel pack carrier brine can be formulated as a miniemulsion, microemulsion, nanoemulsion or single phase emulsion, formed in situ, and allowed to change the OBM of the filter cake after the gravel is in place. The concentration may be adjusted to speed up or slow down the reversal. If acidizing is desired, acid may be placed inside the screens and allowed to diffuse toward the formation to decompose acid soluble components.

One advantage of this procedure is that massive shale or other troublesome shale sections are protected with an OBM until just before the gravel is pumped. A second advantage is that the carrier fluid may form an in situ fluid (e.g. microemulsion) for total contact with the filter cake. A third benefit is that the solids-free and conditioned muds temporarily left in the hole while the screens are run to bottom can be recycled into the OBM. Finally, using the "in situ microemulsion" removing OBM/acidizing technology or using the in situ microemulsion separately allows the operator to base his OBM formulation on reservoir needs because the single phase microemulsion technology is applicable to all OBM filter cakes.

Typically, PACA additives dissolve calcium carbonate and barium sulfate minerals slowly. Laboratory studies indicate that 24 to 48 hours are required to dissolve at least 50% of a given quantity of barium sulfate as shown in Table IV. Also, this Table shows that at least 24 hours are required to dissolve 100% of calcium carbonate. The PACA additives used to prepare the data in Tables V and VI were EDTA and DTPA.

Table V shows injection permeability results after soaking a 10.0 lb/gal (1.2 kg/liter) oil-base filter cake with a soak solution containing PACA. The test below achieved 38% return injection permeability after only a 20-hour contact of the soak solution with the filter cake. The sample without PACA achieved 3% of injection permeability after the 20-hour test. This percentage of injection permeability is acceptable considering only a 20-hour exposure time. Higher injection permeability may be achieved by extending the soak time which will dissolve a greater amount of calcium carbonate and barite.

TABLE IV

Solubilization of Barium Sulfate and Calcium Carbonate Using PACA

| Time hours | Barium Sulfate Solubilization, % | Calcium Carbonate Solubilization, % |
|---|---|---|
| 0 | 0 | 0 |
| 24 | 50 | 100 |
| 48 | 69 | 100 |

TABLE V

In-situ Microemulsion Soak/Injection Permeability Test Results
DFE 734/PACA Single Phase Microemulsion Soak
Disc-Sandpack Permeameter
Test #12 - Two-Hour Mud Off on 20 μm Ceramic Disc
10.0 lb/gal Oil-base Mud with Barite and 50 lb/bbl Calcium Carbonate

| One-Step Soak | Init. Perm | Final Perm | % Inj. Perm |
|---|---|---|---|
| 15% DFE 734 and 27% PACA in NaCl brine.* | 352 mD | 133.8 mD | 38 |
| 15% DFE 734 in NaCl brine.* | 335 mD | 10.05 mD | 3.0 |

*Soak time 20 hours. The test which included the PACA resulted in an improvement in injection permeability over the base-line test.

Filtration Control Additive Embodiment

Three different Single Phase Microemulsion in situ soak solutions (A, B, C) were prepared using three different brine salts and two different DFE-734 or EXP-298 concentrate to form the in situ fluid. The formulations are given in Table VI. The AD (additive for delay) in these Examples was a modified starch, although other filtration control additives may be used.

The test conditions were as follows: Filter cake deposition was conducted onto a 20-micron ceramic disc using 10 lb/gal (1.2 kg/liter) SBM over 3 hours at 150° F. (about 66° C.) and 500 psi (3.4 MPa), then followed by treatment soak conditions of 200 psi, 150° F. (about 66° C.), with the leak-off valve open. The results are plotted on FIGS. 4-7.

Figure 4:
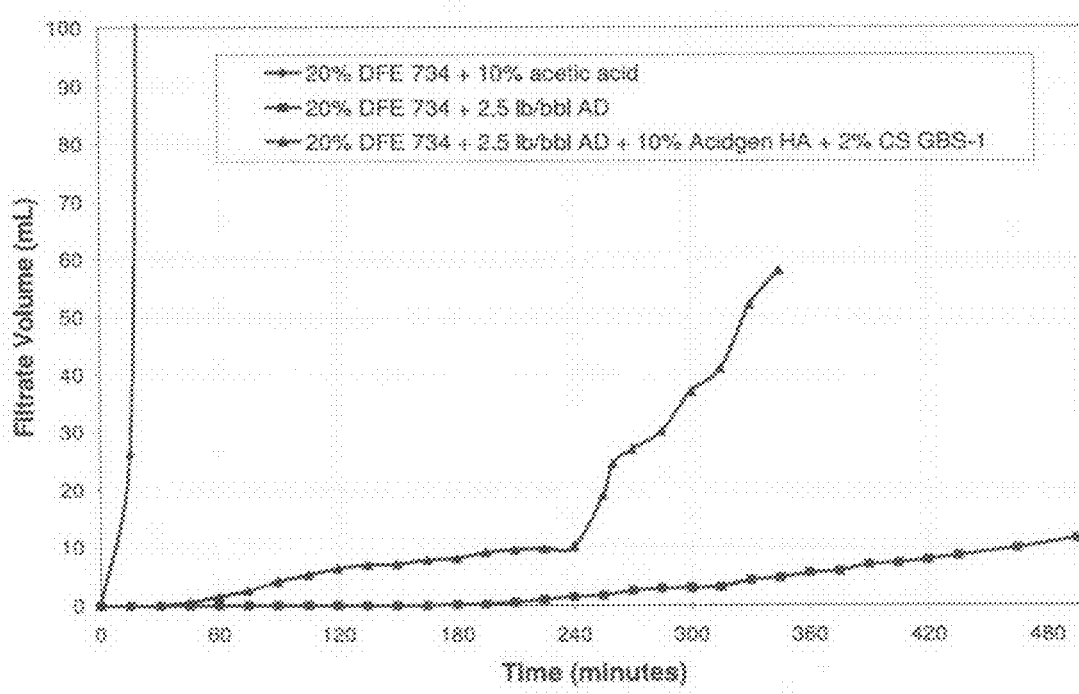
FIG. 4 is a graph of filtrate volume as a function of time for 20% DFE 734 in calcium chloride ($CaCl_2$) brine without a filtration control additive (additive for delay or "AD"), and with 2.51 b/bbl AD alone and then with 10/5 Acidgen HA and 2% CS GBS-1.

Shown in FIG. 4 is a graph of filtrate volume in mL as a function of time for 20% DFE 734 in 10 lb/gal (1.2 kg/liter) calcium chloride ($CaCl_2$) brine without an AD but including 10% acetic acid, and with 2.5 lb/bbl (7.2×10-3 kg/liter) AD alone and then also with 10/5 Acidgen HA and 2% CS GBS-1 where the procedure involved a three-hour mud-off on a 20 m ceramic disk with the leak-off valve open. In all cases an in situ single phase microemulsion was formed. It may be seen that for the formulation without the AD, all of the fluid leaked off in about 20 minutes. However, the use of the AD alone delayed any significant leak off until about 240 minutes (4 hours), whereas nearly complete filtration control was achieved with the AD and the Acidgen HA and CS GBS-1.

Figure 5:
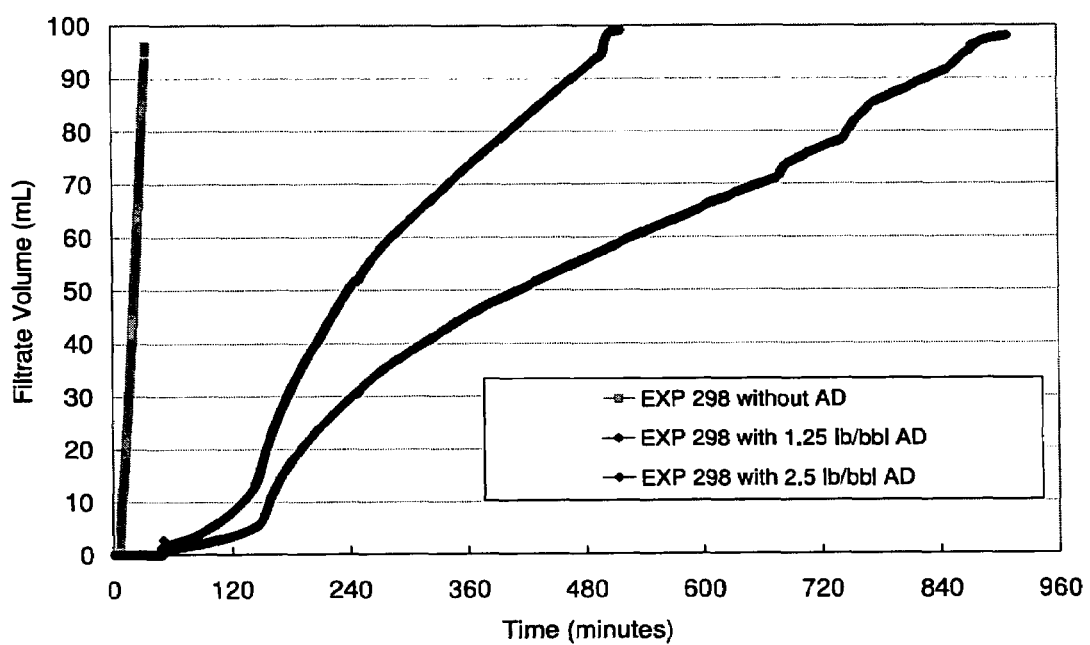
FIG. 5 is a graph of filtrate volume as a function of time for 20% Exp-298 in sodium bromide (NaBr) brine without an additive for delay (AD), and with two different proportions of AD.

Shown in FIG. 5 is a plot of 20% of EXP-298 in 10 lb/gal (1.2 kg/liter) NaBr brine of formulation A giving filtrate volume (ml) as a function of time. The plot for EXP-298 without any AD is a nearly vertical line showing very rapid destruction of the filter cake and nearly instantaneous leak-off. However, use of 1.25 lb/bbl (3.6 g/liter) AD gives a considerably delayed destruction of the filter cake, where filtrate volume did not reach 100 ml until about 480 minutes. An increase in the AD proportion to 2.5 lb/bbl (7.2 g/liter) produced an even more protracted leak-off, where the volume did not react 100 ml until about 900 minutes.

Figure 6:
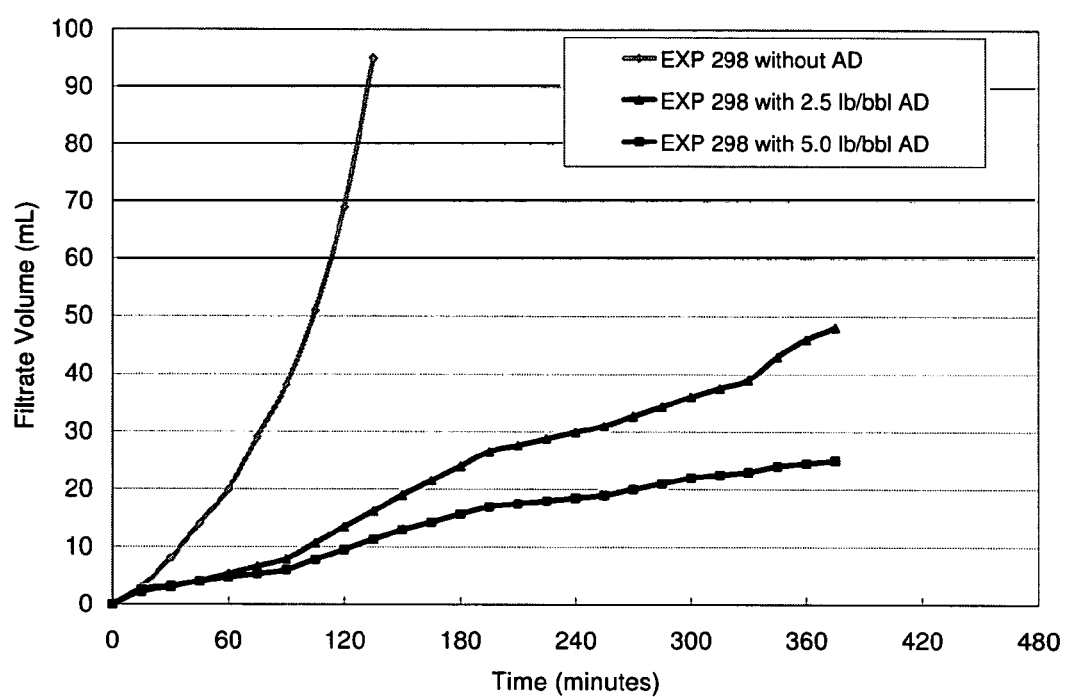
FIG. 6 is a graph of filtrate volume as a function of time for 20% Exp-298 in potassium formate (HCOOK) brine without an AD, and with two different proportions of AD.

Similarly, shown in FIG. 6 is a plot of 20% of EXP-298 in 10 lb/gal (1.2 kg/liter) potassium formate brine of formulation B giving filtrate volume (ml) as a function of time. The plot for EXP-298 without any AD is a quickly rising line showing rapid destruction of the filter cake and fast leak-off. However, use of 2.5 lb/bbl (7.2 g/liter) AD gives a considerably delayed destruction of the filter cake, where filtrate volume did not approach 50 ml until about 360 minutes. An increase in the AD proportion to 5.0 lb/bbl (14.3 g/liter) produced an even more protracted leak-off, where the volume after about 360 minutes did not each 30 ml.

Figure 7:
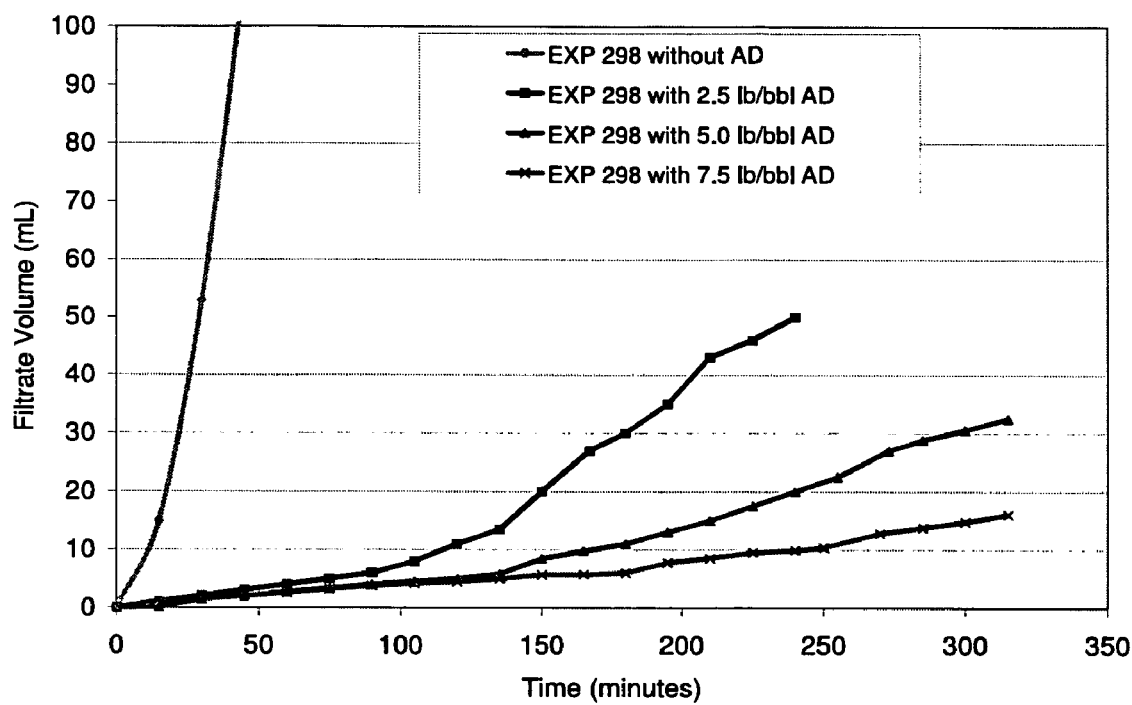
FIG. 7 is a graph of filtrate volume as a function of time for 20% DFE-734 in calcium chloride ($CaCl_2$) brine without an AD, and with three different proportions of AD.

Also, as shown in FIG. 7 is a plot of 20% of DFE-734 in 10 lb/gal (1.2 kg/liter) $CaCl_2$ brine of formulation C giving filtrate volume (ml) as a function of time. The plot for DFE-734 without any AD is another quickly rising line showing rapid destruction of the filter cake and fast leak-off. However, use of 2.5 lb/bbl (7.2 g/liter) AD gives a considerably delayed destruction of the filter cake, where filtrate volume was about 50 ml at about 245 minutes. An increase in the AD proportion to 5.0 lb/bbl (14.3 g/liter) produced an even more protracted leak-off, where the volume after about 320 minutes was just over 30 ml. Increasing the AD amount to 7.5 lb/bbl (about 21 g/liter) delayed the leak-off rate further to where at about 320 minutes the filtrate volume was only about 15 ml.

TABLE VI

Formulations Used in Filtration Tests

| Additives | DFE 734 in 10 lb/gal (1.2 kg/liter) $CaCl_2$ | EXP 298 in 10 lb/gal (1.2 kg/liter) NaBr | EXP 298 in 10 lb/gal (1.2 kg/liter) HCOOK | EXP 298 in 10 lb/gal (1.2 kg/liter) $CaCl_2$ |
|---|---|---|---|---|
| Sodium bromide, wt % | — | 21.8 | — | — |
| Potassium formate, wt % | — | — | 33.7 | — |
| Calcium chloride, wt % | 23.1 | — | — | 23.1 |

TABLE VI-continued

Formulations Used in Filtration Tests

| Additives | DFE 734 in 10 lb/gal (1.2 kg/liter) CaCl$_2$ | EXP 298 in 10 lb/gal (1.2 kg/liter) NaBr | EXP 298 in 10 lb/gal (1.2 kg/liter) HCOOK | EXP 298 in 10 lb/gal (1.2 kg/liter) CaCl$_2$ |
|---|---|---|---|---|
| Water, wt % | 56.9 | 61.5 | 49.6 | 60.3 |
| *EXP 298, wt % | — | 16.7 | 16.7 | 16.7 |
| *DFE 734, wt % | 16.7 | | | |

*16.7% of DFE 734 and 16.7% of EXP 298 by weight are equivalent to 20% by volume Test Conditions:

Cake deposition in 20-microns disc: 10 lb/gal (1.2 kg/liter) SBM, 3 hour at 150° F. (60° C.) and 1000 psi (6.9 MPa).

Soak conditions: 200 psi (1.4 MPa), 150° F. (60° C.), leak-off valve open

In summary, a number of conclusions may be reached.

1. The single phase microemulsion comprised of 10%-25% DFE-734 in brine forms a single phase microemulsion that appears to completely destroy the OBM portion of a filter cake. The filter cake loses all integrity and appears to become essentially entirely dislodged from the ceramic filter medium.
2. Other single phase microemulsion chemistry options are available. DFE-734 results in a CaCl$_2$ brine single phase microemulsion, while other surfactant options support the use of seawater, NaCl, or other brine types.
3. If the OBM is barite free or contains only acid soluble bridging components, the filter cake may be destroyed chemically by the single phase microemulsion chemistry and acid to allow for excellent injection rates.
4. The single phase microemulsion chemistry may be blended in brine containing an acid package to clean up the filter cake in a 1-step clean up process.
5. Static filter cakes deposited for long periods of time will require (1) either a high rate displacement to remove the enlarged, compacted external filter cake volume or (2) a longer soak time and a modified single phase microemulsion.
6. The alteration of the OBM filter cake using the single phase microemulsion or in situ single phase microemulsion technology is applicable after screen deployment or after gravel packing.
7. An operator can drill with an OBM and then safely and efficiently displace to brine in preparation for either a stand-alone screen, an expandable screen or low viscosity α-β open hole gravel pack applications when using a single phase microemulsion.
8. The displacement to brine can occur either before or after the screens have been run, provided the OBM has been conditioned for solids size.
9. In one non-limiting embodiment, the decision to displace an invert emulsion fluid and to remove the filter cake may be reservoir-based and should be determined by such factors including, but not limited to, the nature of drilled solids, formation fluid compatibilities and operation considerations.
10. In another non-restrictive embodiment, the OBM filter cake may be maintained, or conversely the conversion or destruction of the OBM filter cake may be prolonged by the use of filtration control additives, which permit brine losses to be minimized and the work string to be safely pulled out of an open wellbore.

In the foregoing specification, the invention has been described with reference to specific embodiments thereof, and has been suggested as effective in providing effective methods and compositions for removing filter cake particles from a hydrocarbon wellbore. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of single phase microemulsion forming components, chelating agents, acids, filtration control additives, solvents, non-polar liquids, etc. and proportions thereof falling within the claimed parameters, but not specifically identified or tried in a particular composition to improve the removal of filter cake particles herein, are anticipated to be within the scope of this invention. Additionally, the methods and compositions of this invention may find utility in other applications besides screen applications, gravel pack applications and the like.

What is claimed is:

1. A method of removing a majority of oil-based mud (OBM) filter cake particles from a hydrocarbon reservoir wellbore comprising:
   drilling a wellbore in a hydrocarbon reservoir with an OBM;
   forming a filter cake of OBM particles over at least part of the wellbore;
   contacting the OBM filter cake particles with a fluid selected from the group consisting of a nanoemulsion, a miniemulsion, a microemulsion and a single phase microemulsion without circulating the well, where the fluid further comprises a water-soluble filtration control additive selected from the group consisting of solid particulates, polymers and mixtures thereof such that a majority of the oil in the filter cake particles is incorporated into the fluid.

2. The method of claim 1 having characteristic selected from the group consisting of where formation skin damage to the wellbore is reduced, where subsequent hydrocarbon recovery is increased, and where subsequent water injection rate into the reservoir is increased, as compared with an otherwise identical method absent the fluid.

3. The method of claim 1 where the fluid comprises a non-polar liquid selected from the group consisting of synthetic base and mineral oils, ester fluids, paraffins, and isomerized olefins.

4. The method of claim 1 where the fluid comprises one or more surfactants and said surfactants are selected from the group consisting of non-ionic surfactants, anionic surfactant, cationic surfactants and amphoteric surfactants.

5. The method of claim 1 further comprising adding a chelating agent according to a procedure selected from the group consisting of:
   adding the chelating agent to the OBM with the fluid;
   adding the chelating agent to a microemulsion soak solution formed when the fluid contacts the OBM filter cake before removing a majority of the filter cake particles; and
   a combination thereof,
where the method further comprises the chelating agent solubilizing the filter cake particles.

6. The method of claim 1 where in the filtration control additive, the solid particulates are selected from the group consisting of sized salts, hematite, ilmenite, manganese tetroxide, and mixtures thereof, and where the water-soluble polymers are selected from the group consisting of, natural and synthetic polymers and copolymers, and mixtures thereof.

7. The method of claim 1 where the proportion of filtration control additive in the microemulsion ranges from about 0.1 to about 10 lb/bbl.

8. The method of claim 1 where the fluid is a thermodynamically stable, macroscopically homogeneous single phase microemulsion of at least three components, where the three components comprise a polar phase, a nonpolar phase and a surfactant.

9. The method claim 1 where the filter cake particles are selected from the group consisting of calcium carbonate, hematite, ilmenite, manganese tetroxide, manganous oxide, iron carbonate, magnesium oxide, barium sulfate, and mixtures thereof.

10. A method of removing a majority of oil-based mud (OBM) filter cake particles from a hydrocarbon reservoir wellbore comprising:
    drilling a wellbore in a hydrocarbon reservoir with an OBM;
    forming a filter cake of OBM particles over at least part of the wellbore;
    pumping into the wellbore a single phase microemulsion (SPME) gravel pack carrier brine having:
        sized gravel, and
        a water-soluble filtration control additive selected from the group consisting of solid particulates, polymers and mixtures thereof;
    placing a gravel pack into the wellbore;
    incorporating at least a majority of the OBM into the SPME by solubilization without circulating the well;
    changing the wettability of the filter cake particles from oil-wet to water-wet
    allowing the SPME to contact the filter cake for a time as a soak solution; and
    removing a majority of the filter cake particles.

11. The method of claim 10 having a characteristic selected from the group consisting of where formation skin damage to the wellbore is reduced as compared with an otherwise identical method absent the SPME, where subsequent hydrocarbon recovery is increased as compared with an otherwise identical method absent the SPME, and where subsequent water injection rate into the reservoir is increased as compared with an otherwise identical method absent the SPME.

12. The method of claim 10 further comprising adding a chelating agent according to a procedure selected from the group consisting of:
    adding the chelating agent to the OBM with the SPME;
    adding the chelating agent to a microemulsion soak solution formed when the SPME contacts the OBM filter cake before removing a majority of the filter cake particles; and
    a combination thereof,
where the method further comprises the chelating agent solubilizing the filter cake particles.

13. The method of claim 10 where in the filtration control additive, the solid particulates are selected from the group consisting of sized salts, hematite, ilmenite, manganese tetroxide, and mixtures thereof, and where the water-soluble polymers are selected from the group consisting of natural and synthetic polymers and copolymers and mixtures thereof.

14. The method of claim 10 where the proportion of filtration control additive in the microemulsion ranges from about 0.1 to about 10 lb/bbl.

15. The method of claim 10 where the SPME comprises one or more surfactants and said surfactants are selected from the group consisting of non-ionic surfactants, anionic surfactant, cationic surfactants and amphoteric surfactants.

16. The method of claim 10 where the microemulsion is a thermodynamically stable, macroscopically homogeneous mixture.

17. The method claim 10 where the filter cake particles are selected from the group consisting of calcium carbonate, hematite, ilmenite, manganese tetroxide, manganous oxide, iron carbonate, magnesium oxide, barium sulfate, and mixtures thereof.

* * * * *